United States Patent
Martin et al.

(10) Patent No.: US 11,932,515 B2
(45) Date of Patent: Mar. 19, 2024

(54) ELEVATOR TENSION MEMBER MONITOR

(71) Applicant: OTIS ELEVATOR COMPANY, Farmington, CT (US)

(72) Inventors: Kyle B. Martin, Avon, CT (US); Randy Roberts, Hebron, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 81 days.

(21) Appl. No.: 17/222,458

(22) Filed: Apr. 5, 2021

(65) Prior Publication Data

US 2022/0315385 A1 Oct. 6, 2022

(51) Int. Cl.
*B66B 7/12* (2006.01)
*B66B 1/34* (2006.01)
*B66B 3/00* (2006.01)
*B66B 9/00* (2006.01)
*G01B 11/08* (2006.01)

(52) U.S. Cl.
CPC .......... *B66B 7/1215* (2013.01); *B66B 1/3492* (2013.01); *B66B 3/002* (2013.01); *B66B 9/00* (2013.01); *G01B 11/08* (2013.01)

(58) Field of Classification Search
CPC ..... B66B 7/1215; B66B 1/3492; B66B 3/002; B66B 9/00; B66B 7/1223; B66B 7/1238; G01B 11/08
See application file for complete search history.

(56) References Cited

U.S. PATENT DOCUMENTS

| | | | |
|---|---|---|---|
| 4,117,908 A * | 10/1978 | Nara | B66B 7/06 187/254 |
| 10,859,372 B2 * | 12/2020 | Dou | B66B 7/123 |
| 2011/0315489 A1 * | 12/2011 | Nakamori | B66B 7/1215 73/158 |
| 2013/0048438 A1 * | 2/2013 | Mangini | B66B 7/06 187/414 |
| 2013/0133983 A1 * | 5/2013 | Mangini | B66B 5/021 187/277 |
| 2014/0000985 A1 * | 1/2014 | Fukui | B66B 5/022 187/247 |
| 2014/0229011 A1 * | 8/2014 | Fukui | B66B 7/06 700/275 |

(Continued)

FOREIGN PATENT DOCUMENTS

| | | | |
|---|---|---|---|
| JP | 2008214037 A | * | 9/2008 |
| WO | 2010092619 A1 | | 8/2010 |
| WO | 2020200727 A1 | | 10/2020 |

OTHER PUBLICATIONS

Extended European Search Report for Application No. EP 21 21 3831 dated Jun. 7, 2022.

*Primary Examiner* — Michael A Riegelman
(74) *Attorney, Agent, or Firm* — Carlson, Gaskey & Olds, P.C.

(57) ABSTRACT

An illustrative example embodiment of an elevator tension member monitor includes an optoelectronic detector configured to be situated near the elevator tension member. The optoelectronic detector provides an output corresponding to a profile of the elevator tension member. A processor receives the output from the optoelectronic detector and determines whether there are any anomalies in the profile of the elevator tension member. The processor reports any determined anomaly in the profile of the elevator tension member.

19 Claims, 3 Drawing Sheets

(56) References Cited

U.S. PATENT DOCUMENTS

| | | | |
|---|---|---|---|
| 2015/0027814 A1* | 1/2015 | Benosman | B66B 5/02 |
| | | | 187/247 |
| 2018/0016117 A1* | 1/2018 | Palazzola | B66B 7/1238 |
| 2019/0063903 A1* | 2/2019 | Dou | G01B 11/08 |
| 2020/0255260 A1* | 8/2020 | Roberts | B66B 5/0018 |
| 2020/0299101 A1* | 9/2020 | Puranen | B66B 7/10 |
| 2020/0407191 A1* | 12/2020 | Roberts | B66B 5/0006 |
| 2021/0206597 A1* | 7/2021 | Kalliomaki | B66B 5/02 |
| 2021/0309486 A1* | 10/2021 | Martin | B66B 5/0025 |
| 2022/0089408 A1* | 3/2022 | Valjus | B66B 7/1238 |
| 2022/0315385 A1* | 10/2022 | Martin | B66B 7/1215 |

\* cited by examiner

ELEVATOR TENSION MEMBER MONITOR

BACKGROUND

Some elevators are traction-based and include tension members suspending the elevator car and a counterweight. The tension members typically include steel tension members or belts. A traction sheave of the elevator machine rotates to cause movement of the tension members which results in desired movement of the elevator car.

Steel rope tension members are subject to wear or damage over time. Typical inspection techniques involve a technician entering the hoistway to manually inspect the condition of the tension members. Any frayed strands or worn parts of steel rope tension members have to be identified by touching and observing the tension members. The number of broken wires is often used as an inspection criterion. Other types of tension members may experience wear or damage. The technician typically has to inspect the entire length of each tension member. This process is time-consuming and, therefore, introduces additional maintenance cost.

SUMMARY

An illustrative example embodiment of an elevator tension member monitor includes an optoelectronic detector configured to be situated near the elevator tension member. The optoelectronic detector provides an output corresponding to a profile of the elevator tension member. A processor receives the output from the optoelectronic detector and determines whether there are any anomalies in the profile of the elevator tension member. The processor reports any determined anomaly in the profile of the elevator tension member.

In addition to one or more of the features described above, or as an alternative, the optoelectronic detector comprises an emitter that comprises at least one light source, and a detector spaced from the emitter in a manner that accommodates the elevator tension member between the emitter and the detector such that the elevator tension member interrupts the light, the detector providing the output based on an amount of the light that is interrupted by the elevator tension member.

In addition to one or more of the features described above, or as an alternative, the at least one light source comprises a plurality of light emitting diodes.

In addition to one or more of the features described above, or as an alternative, the optoelectronic detector comprises a two-dimensional laser profile scanner.

In addition to one or more of the features described above, or as an alternative, the determined anomaly comprises a reduced dimension of the elevator tension member along at least a portion of the elevator tension member or an increase in an outer dimension of the elevator tension member along at least a portion of the elevator tension member.

In addition to one or more of the features described above, or as an alternative, the processor is configured to determine any portion of the elevator tension member that includes the determined anomaly and to provide an indication of the determined portion.

In addition to one or more of the features described above, or as an alternative, the indication of the determined portion includes information regarding a location of the portion along a length of the elevator tension member.

In addition to one or more of the features described above, or as an alternative, an elevator system includes an elevator car, a plurality of elevator tension members suspending the elevator car, and the elevator tension member monitor of any previous paragraph. The output of the optoelectronic detector corresponds to a profile of each elevator tension member. The processor is configured to determine whether the output of the optoelectronic detector indicates any anomaly in any of the respective profiles of the elevator tension members. The processor is configured to associate a position of the elevator car with a detected anomaly. The processor uses the associated position of the elevator car to determine the location of the portion along the length of the elevator tension member that includes the detected anomaly.

In addition to one or more of the features described above, or as an alternative, the output of the optoelectronic detector includes an indication of a position of the at least one elevator tension member, the processor determines whether there is any vibration or lateral movement of the at least one elevator tension member based on changes in the indication of the position, and the processor determines whether the lateral movement satisfies at least one criterion corresponding to a possible condition of the elevator tension member.

In addition to one or more of the features described above, or as an alternative, the processor generates an alert indicating tension member sway when the vibration or lateral movement satisfies the at least one criterion and the possible condition is tension member sway, or improper tension member tension when the vibration or lateral movement satisfies the at least one criterion and the possible condition is improper tension member tension.

An illustrative example embodiment of a method of monitoring an elevator tension member includes situating an optoelectronic detector near at least one elevator tension member, detecting a profile of the at least one elevator tension member using the optoelectronic detector, determining whether the detected profile includes any anomalies, and reporting an indication of at least one portion of the elevator tension member that includes an anomaly.

In addition to one or more of the features described above, or as an alternative, the method includes detecting a position of the at least one elevator tension member, determining whether there is any vibration or lateral movement of the at least one elevator tension member based on changes in the detected position, and determining whether the vibration or lateral movement satisfies at least one criterion corresponding to a possible condition of the elevator tension member.

In addition to one or more of the features described above, or as an alternative, the method includes generating an alert indicating tension member sway when the vibration or lateral movement satisfies the at least one criterion and the possible condition is tension member sway, or improper tension member tension when the vibration or lateral movement satisfies the at least one criterion and the possible condition is improper tension member tension.

In addition to one or more of the features described above, or as an alternative, an anomaly comprises a reduced diameter of the at least one portion of the elevator tension member or an increase in an outer dimension of the at least one portion of the elevator tension member.

In addition to one or more of the features described above, or as an alternative, the indication includes information regarding a location of the at least one portion along a length of the elevator tension member.

In addition to one or more of the features described above, or as an alternative, a plurality of elevator tension members suspend an elevator car and the method includes detecting the profile of each of the elevator tension members, determining whether any of the detected profiles includes any anomalies, associating a position of the elevator car with a detected anomaly, and using the associated position of the elevator car to determine the location of the portion along the length of the elevator tension member that includes the detected anomaly.

In addition to one or more of the features described above, or as an alternative, that the optoelectronic detector includes an emitter of radiation and a detector that is configured to detect the emitted radiation. The detector is configured to be situated near the elevator tension member with the elevator tension member between the emitter and the detector such that the elevator tension member interrupts the radiation. The detector provides an output corresponding to an amount of the radiation that is interrupted by the elevator tension member.

In addition to one or more of the features described above, or as an alternative, the optoelectronic detector comprises a two-dimensional laser profile scanner.

The various features and advantages of at least one disclosed example embodiment will become apparent to those skilled in the art from the following detailed description. The drawings that accompany the detailed description can be briefly described as follows.

DETAILED DESCRIPTION

Figure 1:
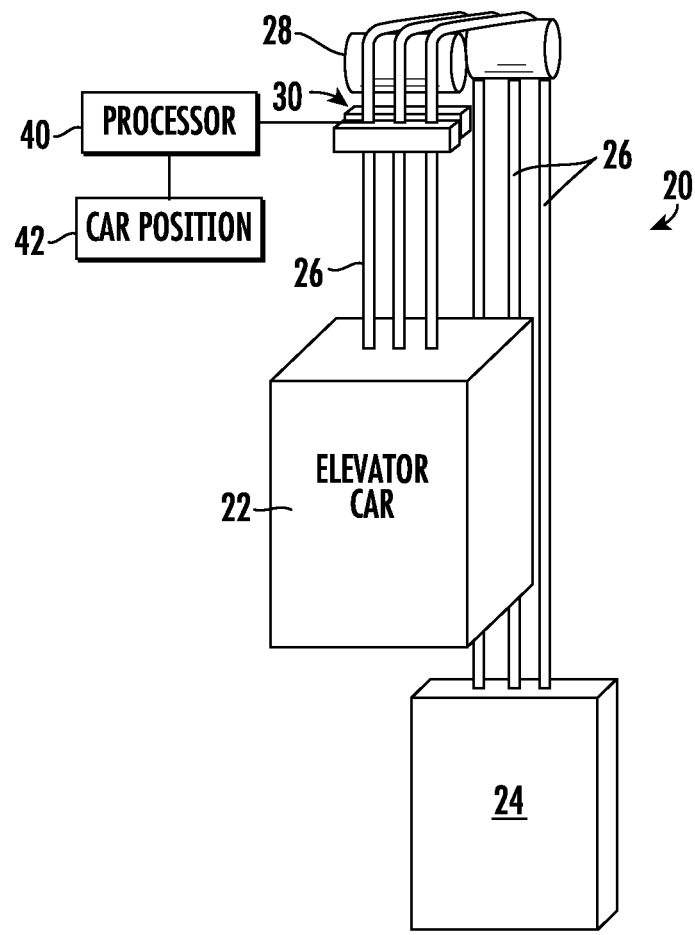
FIG. 1 schematically illustrates selected portions of an example embodiment of an elevator including a tension member monitor device.

FIG. 1 schematically illustrates selected portions of an elevator system 20. An elevator car 22 is coupled to a counterweight 24 by a plurality of tension members 26 that suspend the elevator car 22 and counterweight 24. In some embodiments, the tension members 26 are round steel ropes. Other embodiments includes ropes made of different materials. Still other embodiments include belts as the tension members 26. A traction sheave 28 of an elevator machine rotates to cause movement of the tension members 26, which results in desired movement of the elevator car 22. Over time the tension members 26 may wear or become damaged.

Figure 2:
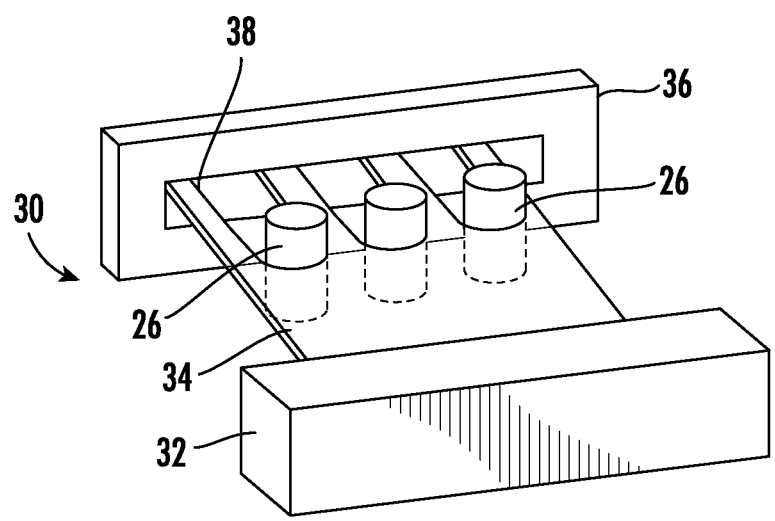
FIG. 2 schematically illustrates portions of the tension member monitor device of FIG. 1.

An optoelectronic elevator tension member monitor 30 is situated near the tension members 26. As shown in FIG. 2, the elevator tension member monitor 30 includes an emitter 32 that emits radiation 34. A detector 36 includes a sensing portion 38 that detects the radiation 34. The emitter 32 and detector 36 are situated on opposite sides of the tension members 26 with the tension members between the emitter 32 and the detector 36. The tension members 26 interrupt the radiation 34. The detector 36 provides an output that corresponds to an amount of the radiation 34 that is detected by the sensing portion 38, which is based on the amount of radiation emitted by the emitter 32 and the amount of the radiation 34 that is interrupted by the tension members 26.

A single emitter 32 and a single sensing portion 38 are shown in the illustration. Some embodiments include multiple emitters 32 or multiple sensing portions 38 with each dedicated to or trained on a selected one of the tension members 26.

In the illustrated example embodiment shown in FIG. 2, the detector 36 provides an output corresponding to a profile of the elevator tension members 26 based on an amount of the radiation 34 that is interrupted by the elevator tension members 26. When the tension members 26 are in an ideal condition, all of the tension members 26 have a consistent profile along their entire length. Over time, portions of the tension members 26 may wear in which case, the outer dimension, such as a diameter, of the corresponding portions of the tension members 26 decreases. Under such conditions, the amount of interrupted radiation 34 decreases and the output of the detector 36 provides an indication of the reduced profile. In some situations in which the tension members 26 are steel ropes, one or more strands of a tension member 26 may be damaged or broken and a segment of such a strand may protrude outward from the tension member 26. Such a condition results in an increased outside dimension of the affected tension member 26 at that location. The larger outside dimension may result in an increased interruption of the radiation 34 detected by the sensing portion 38 of the detector 36.

In some embodiments, the radiation 34 comprises light and the emitter 32 includes a light source, such as a plurality of light emitting diodes. The sensing portion 38 in such embodiments includes an optoelectronic sensing array. The detector 36 is capable of providing highly precise measurements, such as on a micrometer scale, which allows for detecting even slight changes in the profile of a tension member 26.

The illustrated example embodiment includes a processor 40 (FIG. 1) that receives the output from the detector 36. The processor 40 determines whether the output from the detector 36 includes or indicates any anomaly in the profile of any of the tension members 26. A change in the profile of a tension member 26 along any portion of the tension member 26 is considered an anomaly. In this embodiment, the processor 40 is configured to report the type of anomaly, such as wear associated with a detected decrease in the outside dimension or damage to at least one strand associated with a detected increase in the amount of radiation interrupted by a corresponding tension member 26.

The processor 40 is configured to associate the location of a portion of an affected tension member 26 with a position of the elevator car 22. A source of elevator car position information 42 provides information regarding the position of the elevator car 22 to the processor 40. For example, the source of elevator car position information 24 may be a machine encoder or another known device that tracks and reports the position of the elevator car 22. In some embodiments, the processor 40 may be a part of an elevator control that is responsible for keeping track of the location or position of the elevator car 22 so that information is available to the processor 40. In some embodiments, the processor 40 is configured to communicate with an elevator control that provides information regarding the position of the elevator car 32.

The processor 40 uses the car position information to determine which section or portion of the tension member 26 includes an anomaly. The portion of the tension member 26 that is in view of the monitor 30 depends on the position of the elevator car 22. The processor 40 is configured to generate a report or a map that indicates locations of anomalies on a tension member 26 along the length of the tension member 26. The processor 40 relates or associates the indications of the anomalies with corresponding positions of the elevator car 22 to generate the report or map of the anomalies.

Providing the locations of detected anomalies significantly reduces the task of an individual who manually inspects the tension members 26. Instead of having to inspect the entire length of the tension members 26, a technician can focus on the portions of the tension members 26 where an anomaly has been detected. The technician can use the information provided by the processor 40 to inspect the tension members 26 and determine if any further action, such as replacement, is needed in a more efficient manner.

The sensing portion 38 also provides an indication of the position of the tension members 26 based on which sections of the sensing portion 38 detect the radiation 34. The position of each tension member 26 dictates which sections of the sensing portion 38 do not receive or detect the radiation 34 because it is interrupted by a tension member 26. The processor 40 determines whether the position of a tension member 26 changes over time. For example, the tension members 26 may move laterally or side-to-side under certain conditions. The output of the detector 36 includes an indication of the position of the tension members 26.

The processor determines whether changes in the positions of the tension members 26 over time and characteristics of such movement satisfy at least one criterion that corresponds to a condition that may require attention. For example, a magnitude or frequency of vibration or lateral movement of the tension members 26 may correspond to an undesired tension member sway condition. Based on the car position information, the processor 40 may determine whether observed tension member vibrations increase in frequency as the length of tension member between the elevator car 22 and the traction sheave 28 decreases. If those conditions are present, the processor determines that there is tension member sway. The processor 40 may provide an alert or warning regarding a determined sway condition, which may be used to alter control over movement of the elevator car 22.

Another example condition that may be determined by the processor 40 is improper tension member tension. For example, when the indication from the tension member monitor 30 indicates vibration of the tension members 26, the processor 40 may determine whether the vibration frequency corresponds to a condition in which the tension members 26 are not properly tensioned.

Figure 3:
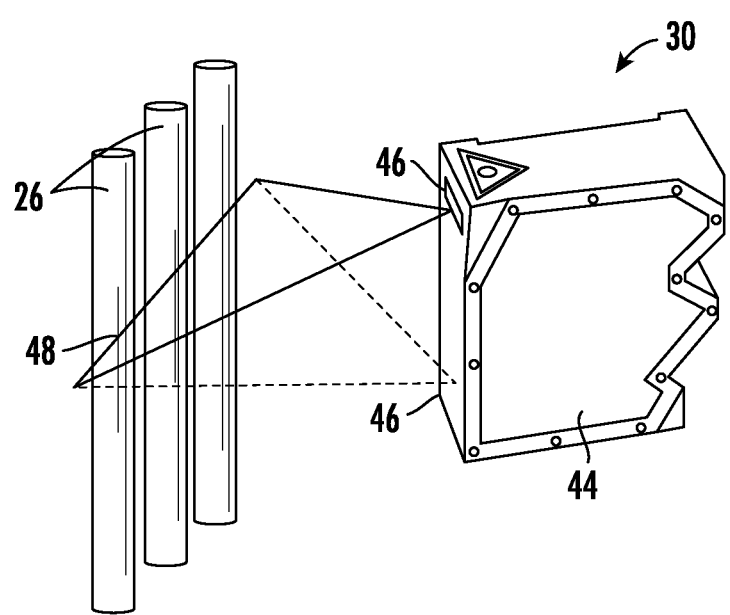
FIG. 3 schematically illustrates another example tension member monitor device configuration.

FIG. 3 illustrates another example configuration of a tension member monitor 30. In this embodiment, the tension member monitor 30 includes a commercially available two-dimensional scanner 44 that scans the profiles of the tension members 26. Laser diodes 46 emit laser light to generate a profile scanning laser line 48. The scanner 44 provides an indication of the surface profile of the portion of the tension members 26 in view of the scanning laser line 48. The processor 40 uses the information provided by the scanner 44 to detect anomalies in the profile of each tension member and to monitor the position, vibration or lateral movement of each tension member to make determinations like those described above.

Figure 4:
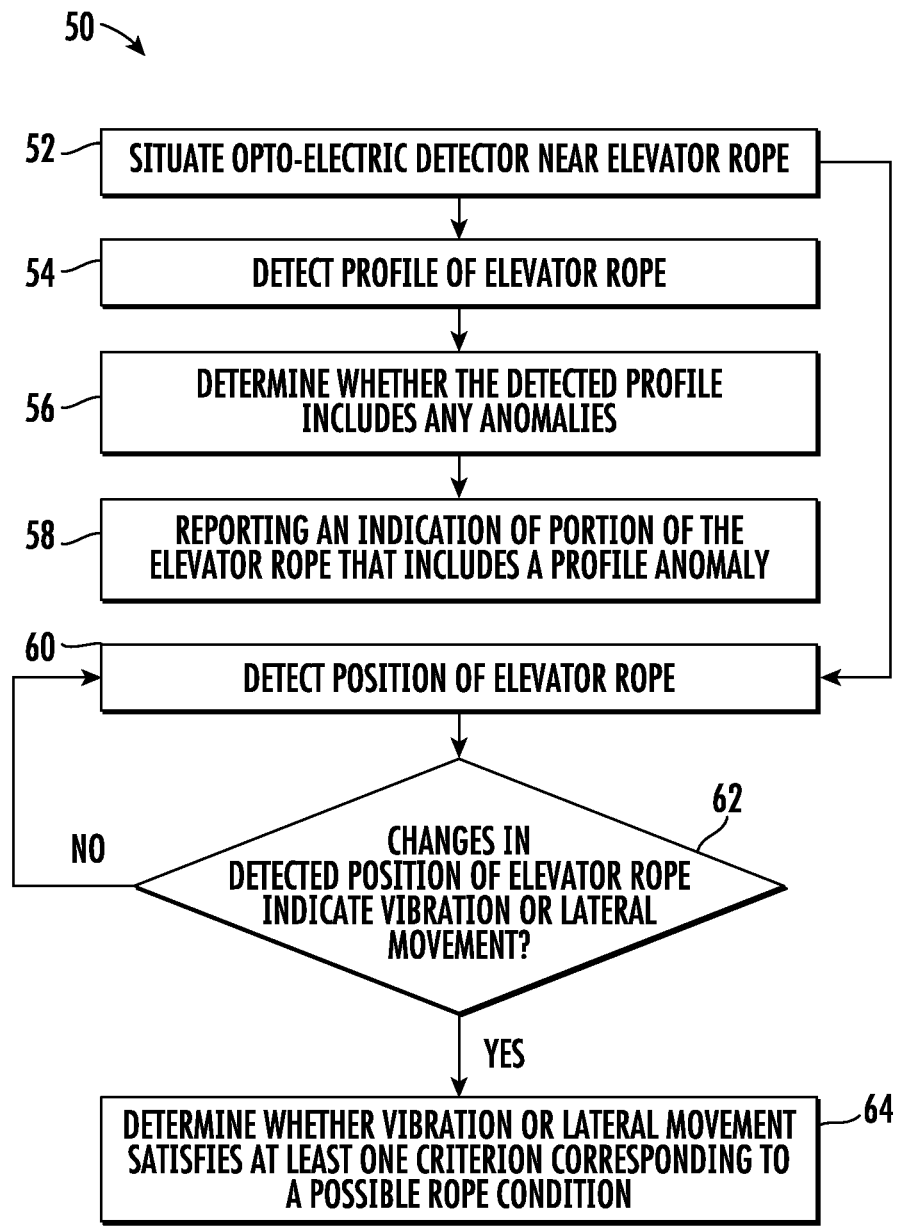
FIG. 4 is a flow chart diagram summarizing an example method of monitoring an elevator tension member.

FIG. 4 is a flow chart diagram 50 that summarizes an example method of monitoring an elevator tension member 26 with an optoelectronic tension member monitor device 30. While a single tension member is discussed in this context and a rope is mentioned in the illustration, the technique illustrated in FIG. 4 can be applied to any type of tension member and to all of the tension members 26 simultaneously.

At 52, the optoelectronic monitor device 30 is situated near the elevator tension member 26. This portion of the example method may be done by a mechanic as part of an inspection or maintenance procedure. Alternatively, the monitor device 30 may be permanently situated within the hoistway of the elevator system 20. The position of the monitor device 30 may vary to meet the needs of a particular elevator system configuration. For example, the monitor device 30 may be situated near a top of the hoistway and close to the traction sheave 28 because the tension members 26 experience a significant number of bending cycles in that area.

At 54, the tension member monitor 30 provides an indication of the profile of the elevator tension member 26. At 56, the processor 40 determines whether the detected profile includes any anomalies. In the event that there is at least one anomaly, the processor 40 reports an indication of a portion of the tension member 26 that includes a profile anomaly at 58.

In the illustrated example method, which is useful in some embodiments, the detector 36 also detects the position of the tension member 26 at 60. The processor 40 determines at 62 whether any changes in the detected position of the elevator tension member 26 indicate vibration or lateral movement of the tension member 26. If not, the lower segment of the illustrated process continues at 60. If there is vibration or lateral movement, the processor 40 determines at 64 whether the vibration or lateral movement satisfies at least one criterion corresponding to a possible tension member condition, such as improper tension or tension member sway.

The disclosed example embodiment is useful to monitor an elevator tension member and to provide an indication of a wear or damage condition of the tension member, an indication of tension member sway, or a combination of such indications. With the disclosed example monitor device and technique, an elevator mechanic or technician can more efficiently assess a condition of an elevator tension member.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. An elevator tension member monitor, comprising:
   a two-dimensional laser profile scanner configured to scan a portion of an elevator tension member that is in view of a profile scanning laser line emitted by the two-dimensional laser profile scanner, wherein
   the elevator tension member has a surface facing the two-dimensional laser profile scanner,
   the profile scanning laser line is configured to scan a surface profile of the surface of the elevator tension member facing the two-dimensional laser profile scanner, and
   the two-dimensional laser profile scanner provides an output corresponding to the surface profile of the surface of the elevator tension member facing the two-dimensional laser profile scanner; and
   a processor that receives the output from the two-dimensional laser profile scanner and determines whether there are any anomalies in the surface profile of the elevator tension member, the processor reporting any determined anomaly in the surface profile of the elevator tension member.

2. The elevator tension member monitor of claim 1, wherein a determined anomaly comprises a reduced dimension of the elevator tension member along at least a portion of the elevator tension member or an increase in an outer dimension of the elevator tension member along at least a portion of the elevator tension member.

3. The elevator tension member monitor of claim 2, wherein the processor is configured to determine any portion of the elevator tension member that includes the determined anomaly and to provide an indication of a determined portion.

4. The elevator tension member monitor of claim 3, wherein the indication of the determined portion includes information regarding a location of the portion along a length of the elevator tension member.

5. An elevator system, comprising:
an elevator car;
a plurality of elevator tension members suspending the elevator car; and
the elevator tension member monitor of claim 4, wherein
the output of the two-dimensional laser profile scanner corresponds to the surface profile of each elevator tension member,
the processor is configured to determine whether the output of the two-dimensional laser profile scanner indicates any anomaly in any respective profiles of the plurality of elevator tension members,
the processor is configured to associate a position of the elevator car with a detected anomaly, and
the processor uses an associated position of the elevator car to determine the location of the portion along the length of the elevator tension member that includes the detected anomaly.

6. The elevator system of claim 5, wherein
the output of the two-dimensional laser profile scanner includes an indication of a position of at least one elevator tension member of the plurality of elevator tension members,
the processor determines whether there is any vibration or lateral movement of the at least one elevator tension member based on changes in the indication of the position, and
the processor determines whether the lateral movement satisfies at least one criterion corresponding to a possible condition of the elevator tension member.

7. The elevator system of claim 6, wherein the processor generates an alert indicating
tension member sway when vibration or lateral movement satisfies the at least one criterion and the possible condition is tension member sway, or
improper tension member tension when the vibration or lateral movement satisfies the at least one criterion and the possible condition is improper tension member tension.

8. The elevator tension member monitor of claim 1, wherein the two-dimensional laser profile scanner includes laser diodes that emit laser light to generate the profile scanning laser line, and wherein the two-dimensional laser profile scanner provides an indication of the surface profile of the surface of the elevator tension member that is in view of the profile scanning laser line.

9. The elevator tension member monitor of claim 1, wherein the elevator tension member is comprised of a plurality of strands, and wherein the profile scanning laser line scans surfaces of strands from the plurality of strands that face the two-dimensional laser profile scanner to provide the surface profile including scanned strand surface profiles of the surface of the elevator tension member that faces the two-dimensional laser profile scanner.

10. The elevator tension member monitor of claim 1, wherein the surface facing the two-dimensional laser profile scanner extends across a body of the elevator tension member from one edge of the elevator tension member to an opposite edge, and wherein the output comprises the surface profile of the surface of the elevator tension member that faces the two-dimensional laser profile scanner and extends along the body from the one edge to the opposite edge.

11. A method of monitoring an elevator tension member, the method comprising:
situating a two-dimensional laser profile scanner in a position to scan at least a portion of at least one elevator tension member that is in view of a profile scanning laser line emitted by the two-dimensional laser profile scanner, wherein the portion of the at least one elevator tension member has a surface facing the two-dimensional laser profile scanner, and wherein the profile scanning laser line scans the surface;
detecting a surface profile of the surface of the at least one elevator tension member that faces the two-dimensional laser profile scanner with a profile scanning laser line emitted by the two-dimensional laser profile scanner to provide a detected surface profile of the surface facing the two-dimensional laser profile scanner;
determining whether the detected surface profile includes any anomalies; and
reporting an indication of at least one portion of the elevator tension member that includes an anomaly.

12. The method of claim 11, comprising
detecting a position of the at least one elevator tension member,
determining whether there is any vibration or lateral movement of the at least one elevator tension member based on changes in a detected position, and
determining whether vibration or lateral movement satisfies at least one criterion corresponding to a possible condition of the elevator tension member.

13. The method of claim 12, comprising generating an alert indicating
tension member sway when the vibration or lateral movement satisfies the at least one criterion and the possible condition is tension member sway, or
improper tension member tension when the vibration or lateral movement satisfies the at least one criterion and the possible condition is improper tension member tension.

14. The method of claim 11, wherein an anomaly comprises a reduced diameter of the at least one portion of the elevator tension member or an increase in an outer dimension of the at least one portion of the elevator tension member.

15. The method of claim 11, wherein the indication includes information regarding a location of the at least one portion along a length of the elevator tension member.

16. The method of claim 11, wherein the at least one elevator tension member comprises a plurality of elevator tension members that suspend an elevator car and the method includes
detecting the surface profile of each of the plurality of elevator tension members;
determining whether any detected profiles include any anomalies;
associating a position of the elevator car with a detected anomaly; and using an associated position of the elevator car to determine a location of the portion along a length of the elevator tension member that includes the detected anomaly.

17. The method of claim 11, including emitting laser light from laser diodes to generate the profile scanning laser line, and wherein the two-dimensional laser profile scanner provides an indication of the surface profile of the surface of the at least one elevator tension member that is in view of the profile scanning laser line.

18. The method of claim 11, wherein the elevator tension member is comprised of a plurality of strands, and including having the profile scanning laser line scan surfaces of strands from the plurality of strands that face the two-dimensional laser profile scanner to provide the detected surface profile including scanned strand surface profiles of the surface of the elevator tension member that faces the two-dimensional laser profile scanner.

19. The method of claim 11, wherein the surface facing the two-dimensional laser profile scanner extends across a body of the elevator tension member from one edge of the elevator tension member to an opposite edge, and wherein an output of the detected surface profile of the surface facing the two-dimensional laser profile scanner comprises a surface profile of the surface of the elevator tension member that extends along the body from the one edge to the opposite edge.

\* \* \* \* \*